(12) United States Patent
Ruiz et al.

(10) Patent No.: US 9,691,032 B2
(45) Date of Patent: Jun. 27, 2017

(54) KNOWLEDGE DISCOVERY FROM BELIEF NETWORKS

(71) Applicant: Adobe Systems Incorporated, San Jose, CA (US)

(72) Inventors: Carlos Riquelme Ruiz, Stanford, CA (US); Eunyee Koh, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 379 days.

(21) Appl. No.: 14/154,777

(22) Filed: Jan. 14, 2014

(65) Prior Publication Data
US 2015/0199613 A1 Jul. 16, 2015

(51) Int. Cl.
G06N 3/08 (2006.01)
G06N 7/00 (2006.01)

(52) U.S. Cl.
CPC .............. *G06N 7/005* (2013.01); *G06N 3/08* (2013.01)

(58) Field of Classification Search
None
See application file for complete search history.

(56) References Cited

PUBLICATIONS

Baldi, et al, Modeling the Internet and the Web: Probabilistic Methods and Algorithms, JohnWiley & Sons Ltd., 2003.*
Baldi, et al., Modeling the Internet and the Web: Probabilistic Methods and Algorithms, JohnWiley & Sons Ltd., 2003.*
Jaroszewicz, et al., Interestingness of Frequent Itemsets Using Bayesian Networks as Background Knowledge, KDD '04, Proceedings of the tenth ACM SIGKDD international conference on Knowledge discovery and data mining, 2004, pp. 178-186.*
Friedman, "The Bayesian Structural EM Algorithm", Proceedings of the Fourteenth Conference on Uncertainty in Artificial Intelligence, pp. 129-138 (1998).
Friedman, "Data Analysis with Bayesian Networks: A Bootstrap Approach", Proceedings of the Fifteenth Conference on Uncertainty in Artificial Intelligence, pp. 196-205 (1999).

* cited by examiner

*Primary Examiner* — Wilbert L Starks
(74) *Attorney, Agent, or Firm* — Finch & Maloney PLLC

(57) ABSTRACT

Techniques are disclosed herein for making predictions with respect to how content consumers will interact with a digital asset. For example, in the context of website visitors browsing digital assets provided via a website, web traffic data can be collected and modeled using a belief network. The belief network may represent a probability distribution for a set of variables that define the web traffic data. Examples of such variables include browser type, browsing session duration, geographic location, visitor demographic characteristics, and a browsing outcome. Certain of the embodiments disclosed herein can be used to extract knowledge from the belief network, thereby allowing statistical inferences to be drawn with respect to how certain classes of website visitors will interact with the website. The influence of one or more first variables (for example, geographic location) can be quantified with respect to one or more second variables (for example, the successful result indicator).

19 Claims, 11 Drawing Sheets

Inference  Large-Variations  Popular Profiles

Compute P(M|C)

230 — P(income | success, GEO.City)

210:
- orders
- TOTAL.PAGE.VIEWS
- household.size
- GEO.City  ← 214
- contentId
- 30.day.recency
- SESSION.TIME
- orderValue
- 90.day.recency
- OSVersion
- income  ← 212
- 60.day.recency
- GEO.DMA
- success  ← 214
- home.value
- UserHourType
- age

| Type | Feature  | Value      |
|------|----------|------------|
| M    | income   | not needed |
| C    | GEO.City | New York   |
| C    | success  | TRUE       |

220

240:
- 0-30000      8.30%
- 30000-40000  4.63%
- 40000-50000  6.16%
- 50000-60000  4.06%
- 60000-70000  4.59%
- 70000-max    72.3%

FIG. 6

$$P(\text{"success"} = v_i \mid V_j = v_j)$$

| $v_i$ | $V_j$ | $v_j$ | Influence | Sign |
|---|---|---|---|---|
| TRUE | orderValue | 0-100 | 5299.90 % | ↑ |
| TRUE | orderValue | 100-500 | 5299.90 % | ↑ |
| TRUE | orderValue | 500-1000 | 5299.90 % | ↑ |
| TRUE | TOTAL.PAGE.VIEWS | 8-Max | 117.99 % | ↑ |
| TRUE | SESSION.TIME | 100000-Max | 80.08 % | ↑ |
| TRUE | GEO.City | New York | 36.34 % | ↑ |
| TRUE | GEO.DMA | New York | 34.58 % | ↑ |
| TRUE | OSVersion | Linux | 30.18 % | ↑ |
| TRUE | GEO.DMA | Los Angeles | 29.48 % | ↑ |
| TRUE | GEO.City | Los Angeles | 29.35 % | ↑ |
| TRUE | OSVersion | Others | 29.03 % | ↑ |
| TRUE | GEO.DMA | Chicago | 27.14 % | ↑ |
| TRUE | GEO.DMA | Others | 25.97 % | ↑ |
| TRUE | GEO.City | Atlanta | 25.91 % | ↑ |
| TRUE | home.value | 0-100,000 | 24.83 % | ↑ |
| TRUE | OSVersion | Windows Vista | 24.53 % | ↑ |
| TRUE | OSVersion | Windows XP | 24.21 % | ↑ |
| TRUE | orders | 3 | 23.97 % | ↑ |

Columns 310 covers $V_j$ and $v_j$; column 320 covers Influence. Brace 330 highlights the TOTAL.PAGE.VIEWS and SESSION.TIME rows; brace 340 highlights the GEO.City New York row.

KNOWLEDGE DISCOVERY FROM BELIEF NETWORKS

FIELD OF THE DISCLOSURE

This disclosure relates generally to the discovery and extraction of information from a belief network, and more specifically to methods for using a belief network to make predictions with respect to how content consumers will interact with digital assets such as may be provided via a website.

BACKGROUND

As the number of people with access to the Internet continues to grow, websites have become an increasingly important way for businesses, governments, and other entities to interact with the general public. For example, businesses routinely use websites to distribute information about products and services, conduct advertising and public relations campaigns, and transact business by receiving orders and payments. As a result, website owners often devote substantial resources to analyzing the characteristics and activities of the visitors to the various webpages comprising their website. This analysis, which is generally referred to as web traffic analysis, is used to improve website efficacy in achieving one or more target metrics. Example target metrics include click through rate, sales conversion rate, and subscriber intake rate.

BRIEF DESCRIPTION OF THE DRAWINGS

FIG. 6 is a table ranking the most influential variable-value pairs $(V_j, v_j)$ on a selected variable $V_i$="success" as determined by a large variation finder in accordance with an embodiment of the present invention.

DETAILED DESCRIPTION

Figure 1:
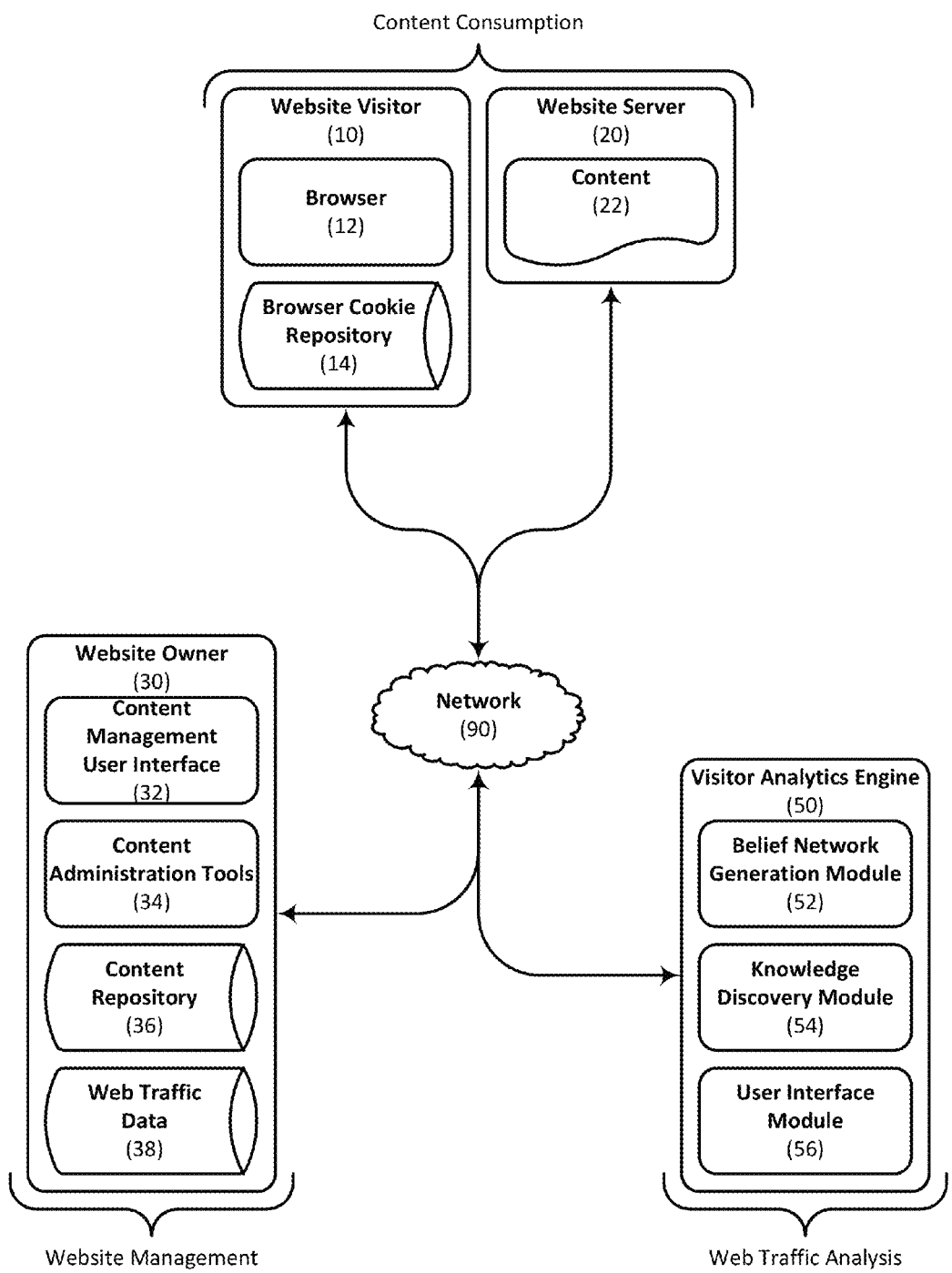
FIG. 1 is a block diagram schematically illustrating how a visitor analytics engine can interact with content consumers and website owners in accordance with an embodiment of the present invention.

Techniques are disclosed herein for making predictions with respect to how content consumers will interact with a digital asset. For example, in the context of website visitors browsing digital assets provided via a website, web traffic data can be collected and modeled using a belief network. In such case, the belief network represents a probability distribution for a set of variables that define the web traffic data. Examples of such variables include browser type, browsing session duration, geographic location, visitor demographic characteristics, and a browsing outcome. Certain of the embodiments disclosed herein can be used to extract knowledge from the belief network, thereby allowing statistical inferences to be drawn with respect to how certain classes of website visitors will interact with the website. For instance, the influence of one or more first variables (for example, geographic location) can be quantified with respect to one or more second variables (for example, the successful result indicator). In other embodiments it can be determined what the most likely values for certain variables are given values for one or more other variables. Other inferences can be drawn in other embodiments. More generally, it will be appreciated that the present invention is not intended to be limited to analysis of web traffic data, but rather can be used to draw inferences from a belief network that models any of a wide variety of behavioral data. Therefore numerous configurations and variations of the belief network knowledge extraction techniques disclosed herein will be apparent in light of this disclosure.

As used herein, the term "website owner" refers, in addition to its ordinary meaning, to a person, organization, or other human- or computer-controlled entity that manages, administers, or otherwise influences the content and/or functionality provided by a website. For instance, a website owner will often be responsible for establishing target metrics that define one or more goals that a given website is intended to achieve. Such goals may include, for example, enrolling citizens in a national healthcare plan, selling merchandise and/or services, or collecting charitable donations. As such, website owners will often seek to extract and analyze actionable information from web traffic data. Such information may be useful toward optimizing the functionality or content of the website with respect to the goals of the website. In some cases a website owner may be responsible for the generation of some or all of the content that is provided on a given website, although in other cases the website owner will obtain content from one or more content providers.

As used herein, the term "belief network" refers, in addition to its ordinary meaning, to a statistical model that represents a set of random variables and their conditional dependencies. Belief networks can be used to identify cause-and-effect relationships between certain variables and quantify such probabilistic relationships with values that represent the extent to which one variable is likely to affect another. For example, in certain of the embodiments disclosed herein, a belief network can be used to represent the probabilistic relationships between website browsing outcomes (for example, complete a purchase, start a subscription, or enroll in a service) and web traffic data (for example, browser type, browsing session duration, or geographic location). Belief networks allow predictions or inferences to be made even where the underlying data is incomplete. A belief network may also be referred to as a "Bayesian network".

As used herein, the term "web traffic data" refers, in addition to its ordinary meaning, to information that characterizes interactions between a website and a website visitor. In general, web traffic data can be understood as comprising at least one variable $V_i$ and a corresponding value $v_i$, although it will be appreciated that in some cases the value $v_i$ may be unknown, and therefore undefined. Examples of variables that may be included in web traffic data include the type of browser used by the website visitor, the amount of time the website visitor spent viewing or interacting with a particular digital asset, demographic data associated with the website visitor, and one or more true/false indicators corresponding to a browsing outcome, such as purchase completion, account creation, or the like. Web traffic data may comprise additional, alternative, or fewer data variables than those listed here, and thus it will be understood that the present invention is not intended to be limited to use of a particular set of variables in conjunction with the modelling and analysis of web traffic data. In some cases the variables that comprise web traffic data are also referred to as "features", such as in the context of features that characterize a group of website visitors.

General Overview

The rapid growth of the Internet has presented website owners with both opportunities and challenges. The large number of people with access to the Internet allows website owners to reach a far larger and more diverse audience than ever before. However, the size and diversity of this potential audience has made it increasingly difficult for website owners to understand how to optimize website performance with respect to a given target metric. In particular, the web traffic data that website owners must rely on is often incomplete and/or difficult to interpret. For example, while web traffic data may include values for a large number of variables, it is often unclear how to draw inferences with respect to user behavior from such data. It is also difficult to detect synergistic relationships between such variables, such as may be the case where two variables do not strongly influence a target outcome when considered separately, but have a combined effect that does strongly influence the target outcome. While a belief network is a powerful tool capable of modeling multivariate probability distributions, existing applications of belief networks are not well-suited for website traffic analysis. For example, although belief networks can be used to model probability distributions comprising tens or even hundreds of random variables, it is difficult to discover relevant dependencies which may be hidden in such a large distribution of variables. In the context of website traffic analysis, this makes it difficult to uncover the statistical relationships which are most useful to a website owner trying to optimize website performance. Because of these difficulties, existing website traffic analysis techniques have generally relied on univariate statistical analysis. However, univariate analysis is generally a poor approach for analyzing human behaviors, such as user interaction with a website, since certain variables may become relevant only when combined together.

Thus, and in accordance with certain embodiments of the present invention, various web traffic analysis methodologies are disclosed herein. In particular, certain of the methodologies disclosed herein can be used to extract knowledge from a belief network that models collected web traffic data. This enables statistical inferences to be drawn with respect to how certain classes of website visitors will interact with content provided via a website. For instance, it can be determined how much knowing the value of one or more given variables (for example, browser type) impacts the distribution of an unknown variable (for example, the successful result indicator). In other embodiments it can be determined what the most likely values for one or more unknown variables are given values for one or more known variables. Knowledge such as this can be used by website owners to better understand their audience and thus optimize website performance with respect to a given target metric.

Thus certain embodiments of the present invention provide a comprehensive and flexible system for understanding how content consumers will interact with digital assets, thereby enabling content owners to optimize such assets based on particular target metrics. It will be appreciated that the knowledge discovery systems and techniques disclosed herein can be applied not only to webpages, but to a wide variety of both online and offline content, including PDF files, word processing documents, presentation materials and spreadsheets. For example, in an alternative embodiment the analysis techniques disclosed herein can be applied to analyze and improve the efficacy of an offline print or display media campaign. Thus other embodiments can be implemented in other contexts where content consumers interact with various types of content, such as in the context of a retail point-of-sale environment, an online videogame environment, a television broadcast, or any other suitable digital media setting.

In general, when a website visitor, which can be considered as having an associated vector of observed variables V that define features of the visitor, interacts with web content c, a browsing outcome s of such interaction can be observed. The browsing outcome s will generally be selected such that it corresponds to a target metric upon which the website is to be evaluated, such as purchase completion, account registration, subscription enrollment, or the like. As multiple such interactions are observed, the resulting web traffic data (V, c, s) can be recorded, thereby resulting in a large multivariate dataset. The web traffic data can be understood as being distributed according to a joint probability distribution P which can be modeled using a belief network G. Knowledge that is derived from joint probability distribution P, and that is extracted from belief network G, can be used by website owners to better understand how variables V interact with each other, thereby allowing website owners to generate improved web content c' that produces improved interaction outcomes s'.

For example, an online marketing campaign will often achieve different results among distinct market segments. These results will be reflected in observed website traffic data having multivariate probability distribution P that can be modeled using belief network G. A website owner may use belief network G to model, for instance, the amount of money likely to be spent by a website visitors who are college graduates in their forties living in Chicagoland. A query such as this can be generalized as the probability distribution P of variable $V_1$ given values for variables $V_2$, $V_3, \ldots V_n$, that is, $$P(V_1|v_2=V_3=v_3,\ldots,V_n=v_n) \quad (1)$$

In the specific example described here, $V_1$="order value", $V_2$="education level", $v_2$="college graduate", $V_3$="age", $v_3$="forties", $V_4$="geographic locale", and $v_4$="Chicagoland". In general, variable $V_1$ can be considered a discrete or continuous random variable that can take a range of values and that has probability distribution P. In certain embodiments belief network G is used to model probability distribution P.

Beyond this, certain of the embodiments disclosed herein also provide website owners with an interactive and easy-to-understand interface for analyzing web traffic data by extracting other types of knowledge from belief network G. A website owner may use such embodiments to explain the dependent and independent relationships between variables V, and more generally, to define multivariate probability distribution P that represents how variables V behave in the context of a given interaction between the website visitor and web content c. Such embodiments may also enable statistically significant hidden variables to be detected, for example by identifying small groups of related variables ("cliques") for which a central new variable can be substituted. This allows a website owner to, for example, explore how changing the values of a first subset of variables affects the behavior of a second subset of variables. Using belief network G to perform such analysis allows statistical inferences to be drawn based on customized conditional probability queries, the results of which can be produced quickly and efficiently. Even variables which are difficult to understand or which do not have an intuitive human meaning still shape belief network G and therefore affect the knowledge extracted therefrom, thereby allowing website owners to leverage such knowledge without needing to understand the underlying data. This helps website owners identify and characterize complex yet meaningful market segments without the need for specialized knowledge or training.

System Architecture

FIG. 1 is a block diagram schematically illustrating how a visitor analytics engine can interact with content consumers and website managers in accordance with an embodiment of the present invention. In such an embodiment, content consumption is represented by a website visitor 10 and a website server 20, both of which are connected to, and can communicate with each other via, a network 90. More specifically, website visitor 10 represents a content consumer who uses a browser 12 to retrieve and view content 22 hosted by website server 20. In certain embodiments website server 20 is a single stand-alone server configured to respond to requests for content 22 from website visitor 10, although in other embodiments website server 20 comprises a geographically distributed network of hundreds or thousands of servers capable of delivering content to an even larger number of website visitors 10. Furthermore, it will be appreciated that even though website visitor 10 and website server 20 are described here in terms specific to the World Wide Web, in alternative embodiments website visitor 10 and website server 20 represent networked clients and one or more severs, respectively, operating in a generalized client-server computing environment.

In certain implementations, communications between website visitor 10 and website server 20 conform to the hypertext transfer protocol (HTTP). The HTTP is a stateless protocol, meaning that, in such implementations, website server 20 does not retain information about website visitor 10. To compensate for this, browser 12 can be configured to store information using "browser cookies", which are also sometimes referred to as HTTP cookies, web cookies, or simply cookies. A browser cookie is a data structure that contains information regarding website visitor 10, such as personally identifying information and/or web browsing history information. Browser cookies can be stored in a browser cookie repository 14 that is administered by website visitor 10, and such cookies can be sent to website server 20 along with a request for content 22. Accessing the data stored in a browser cookie enables website server 20 to obtain identifying information regarding website visitor 10, and thus allows website server 20 to customize, modify, or otherwise adapt content 22 to be more specifically targeted to website visitor 10. The data provided in a browser cookie can also be used to establish a link between a particular website visitor and the content that visitor has consumed.

Still referring to the example embodiment illustrated in FIG. 1, website management is represented by a website owner 30. Like website visitor 10 and website server 20, website owner 30 is also in communication with network 90. In certain embodiments website owner 30 may be a generator and/or a manager of content, such as in the case of an online magazine, a website owned by a newspaper company, a blog, a government website that disseminates information to the public, or a corporate website that provides information to customers and potential customers. In certain applications website owner 30 may also manage the technical operations of website server 20. Website owner 30 may additionally or alternatively be an advertiser that generates promotional content configured to be incorporated into other content that is provided by website owner 30 or that is provided by a third party. In any case, certain of the embodiments disclosed herein provide tools that website owner 30 can use to develop a relatively detailed and accurate profile of the collective website visitors consuming content 22. This facilitates the tailoring of content 22 such that it is better suited toward achieving one or more target metrics established for the underlying website. Example target metrics include click through rates, sales conversion rates, revenue generation rates, and subscriber intake rates. Certain of the embodiments disclosed herein also provide audience profile information that website owner 30 can use to attract third-party advertisers who wish to reach the specific target audience that website owner 30 has established.

Website owner 30 may use a number of different tools for managing content 22. Such tools may include a content management user interface 32 that facilitates authoring and administration of web content 22. A content management user interface 32 may be provided, for example, by any of a variety of suitable web content authoring applications. In other embodiments content can additionally or alternatively be procured from one or more third-party content generation sources. For example, data aggregators can be used to gather information from other sources and generate content based on the aggregated data, either in an automated or semi-automated fashion. Regardless of how it is obtained, the content can be stored in a content repository 36, and when ready for publishing can be deployed to website server 20 where it is hosted for retrieval by website visitor 10. The tools used by website owner 30 may also include content administration tools 34 which can be used to build websites based on the generated or otherwise acquired content, develop website functionality, and analyze how visitors browse and interact with such websites and the content provided therein. For example, in certain embodiments content administration tools 34 may also include tools that can be used to collect web traffic data 38 and analyze how website visitors interact with and consume content 22. In such embodiments content administration tools 34 can be configured to leverage services provided by a visitor analytics engine 50.

Again referring to the example embodiment illustrated in FIG. 1, visitor analytics engine 50 can be configured to analyze web traffic data 38 and generate knowledge that provides insight into how website visitors interact with and consume content 22. In such embodiments visitor analytics engine 50 includes a belief network generation module 52 configured to generate belief network G based on the observed web traffic data 38. Any of a variety of suitable existing or subsequently-developed techniques for generating a belief network can be used in this regard. In certain embodiments, generation of a belief network may comprise a process of learning a network structure, learning network parameters θ, and recursively evaluating the network to find an appropriate solution that models the underlying joint probability distribution P with sufficient accuracy. One example technique for generating a belief network is provided by Friedman, et. al., "The Bayesian Structural EM Algorithm", Proceedings of the Fourteenth Conference on Uncertainty in Artificial Intelligence, pp. 129-138 (1998). One example technique for learning the structure of a belief network is provided by Friedman, et al., "Data Analysis with Bayesian Networks: A Bootstrap Approach", Proceedings of the Fifteenth Conference on Uncertainty in Artificial Intelligence, pp. 196-205 (1999).

Visitor analytics engine 50 may also include a knowledge discovery module 54 that is configured to extract actionable insights from a belief network. For example, knowledge extracted from web traffic data 38 can be used to identify content consumption patterns that website owner 30 can use to optimize website performance with respect to one or more target metrics. Web traffic data can be aggregated using any of a variety of suitable techniques, such as by tracking website visitors on a collective or individualized basis. This can be accomplished, for example, by analyzing browser cookie data received from a large quantity website visitors over a given time period. Such browser cookie data can be used to generate a repository of web traffic data (V, c, s) comprising a vector of observed variables V that define the features of the observed website visitors, identification of the particular web content c with which the respective website visitors interacted, and a browsing outcome s of such interactions. Web traffic data 38 can be understood as being distributed according to a joint probability distribution P which can be modeled using a belief network G. In some embodiments knowledge extracted from belief network G provides website owner 30 with a better understanding of how variables V interact with each other, thereby facilitating generation of improved web content and corresponding improved website visitor interaction outcomes. As illustrated in FIG. 1, visitor analytics engine 50 optionally includes a user interface module 56 that provides website owner 30 with an interactive and easy-to-understand interface for analyzing web traffic data 38 and visualizing knowledge that is extracted therefrom.

Certain of the embodiments disclosed herein can be implemented in various forms of hardware, software, firmware, and/or special purpose processors. For example, in one embodiment a non-transitory computer readable medium has instructions encoded thereon that, when executed by one or more processors, result in implementation of one or more functionalities of the knowledge discovery systems disclosed herein. The computer readable medium can be provided in the form a computer software application or applet that is tangibly embodied on a memory device, and that can be executed by a computing device having any suitable architecture. The memory device may be a non-transitory storage medium suitable for storing digital information, such as a hard drive, a server, flash memory, and/or random access memory. In alternative embodiments, certain of the functionalities disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out certain of the functionalities described herein. The instructions used to implement functionality associated with various embodiments of the knowledge discovery system can be encoded using a suitable programming language, such as C, C++, object-oriented C, JavaScript or BASIC, or alternatively, using custom or proprietary instruction sets. The instructions may be embodied in a computer software application including a number of different modules, sub-modules or other components of distinct functionality that can provide information to, or receive information from, other components.

Methodology and User Interface

Figure 2:
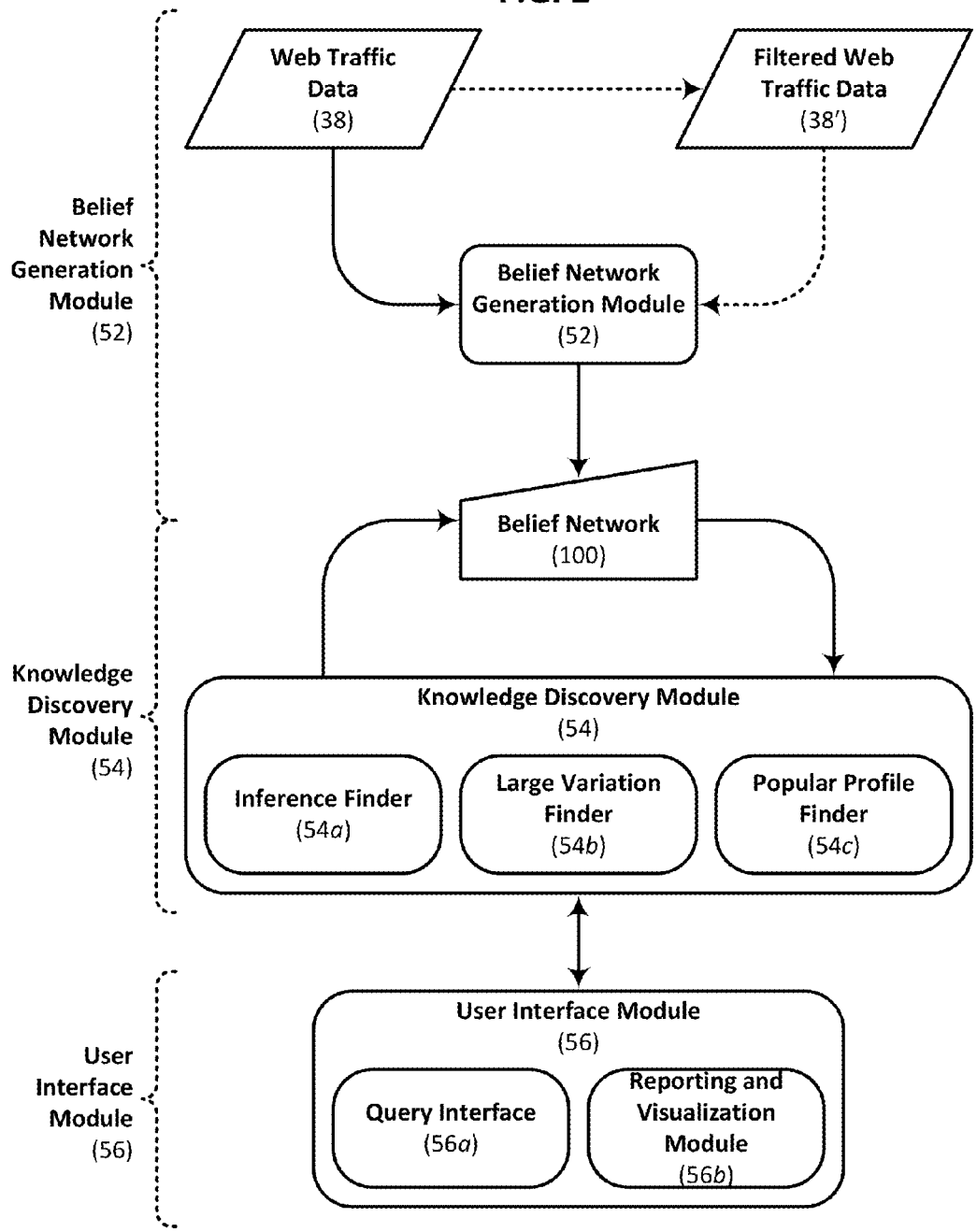
FIG. 2 is a data flow diagram schematically illustrating how a knowledge discovery module can leverage a belief network to make predictions with respect to how content consumers will interact with a digital asset in accordance with an embodiment of the present invention.

FIG. 2 is a data flow diagram schematically illustrating how a knowledge discovery module can leverage a belief network to make predictions with respect to how content consumers will interact with a digital asset in accordance with an embodiment of the present invention. In particular, FIG. 2 illustrates that belief network generation module 52 can be configured to generate a belief network 100 based on web traffic data 38 and/or filtered web traffic data 38'. Any suitable existing or subsequently developed technique for generating a belief network based on observed data can be used to produce belief network 100. Regardless of how belief network 100 is generated or otherwise acquired, knowledge discovery module 54 can then be configured to submit queries to belief network 100 and to extract knowledge from belief network 100 in response to such queries. In certain embodiments an optional user interface module 56 provides an intuitive interface for constructing the queries that knowledge discovery module 54 can use to extract knowledge from belief network 100. User interface module 56 may also be configured to provide visualization tools that facilitate the interpretation and understanding of the knowledge extracted from belief network 100.

As described herein, web traffic data 38 is collected through the use of techniques that allow certain variables to be reliably observed, but that leave other variables capable of being observed only occasionally. For example, because website owner 30 is usually able to monitor operations of website server 20, information that can be collected unilaterally from website server can be understood as corresponding to variables that, for the most part, are reliably and consistently observed. Examples of such data include a website visitor's Internet Protocol (IP) address and whether a website visitor consummated a purchase. However, information that relies on some level of cooperation by website visitor 10 will, in general, be observable only occasionally. For example, if a website visitor logs into a website using a previously registered personal account, it may be possible to obtain demographic information from the user's profile, or other information such as the number of times the user visited the website in the last month. However, if the website visitor does not have such an account, or simply decides not to log in using an existing account, such information may be unobservable.

Because of the inherent difficulty in collecting comprehensive data with respect to every visitor interaction with a website, web traffic data 38 may refer to hundreds of variables V and hundreds of thousands of collected records, with each record including values for some, or occasionally all, of the variables V. To address this challenge and simplify subsequent analyses, in certain embodiments web traffic data 38 is filtered to retain only a relevant subset of the actual collected data. Such filtering may improve processing time and simplify subsequent analyses, particularly if variables known to have little or no human meaning can be removed. In certain embodiments a discretization process is optionally performed on variables of a continuous nature, effectively categorizing the values of such variables into appropriate "buckets", each representing a range of values.

Figure 3:
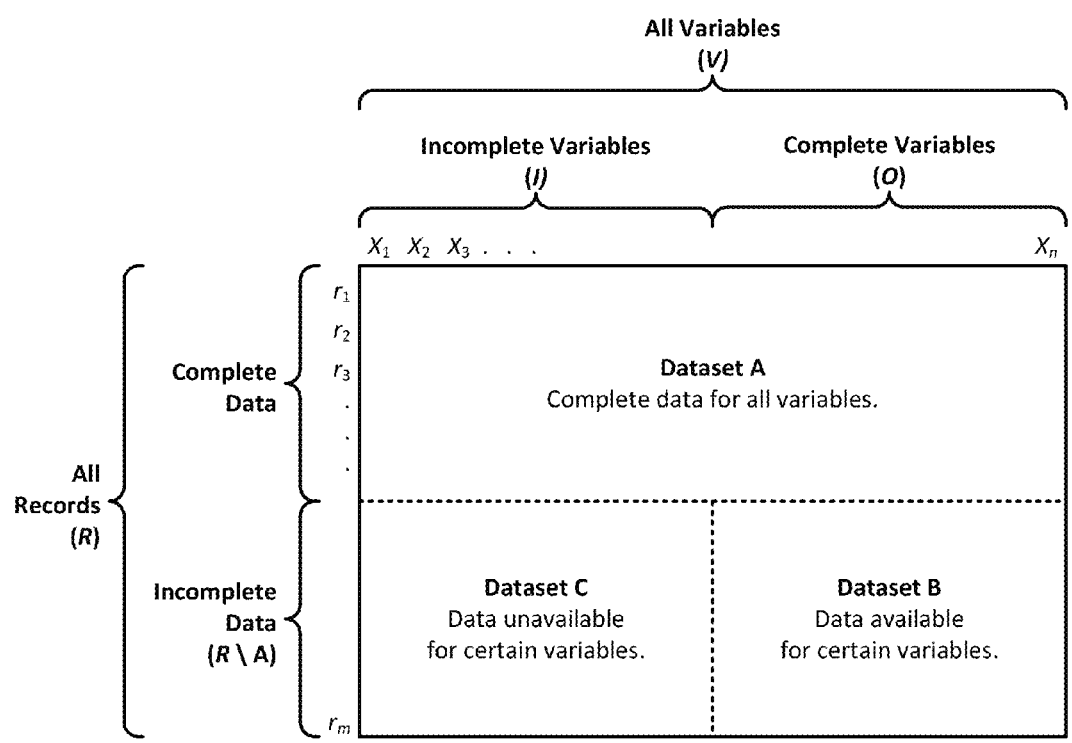
FIG. 3 is a schematic illustration of a data structure corresponding to web traffic data that is conceptually organized in accordance with an embodiment of the present invention.

FIG. 3 is a schematic illustration of a data structure corresponding to web traffic data that is conceptually organized in accordance with an embodiment of the present invention. In particular, FIG. 3 illustrates web traffic data 38 which can be understood as comprising a set of variables $V=\{X_1, X_2, X_3, \ldots, X_n\}$ and a set of records $R=\{r_1, r_2, r_3, \ldots, r_m\}$. Each record $r_j$ can be understood as taking a value for each variable $X_i$, namely, $X_i(r_j)=v_{ij}$, although it will be appreciated that not all such values $v_{ij}$ may be observable, as described herein. To emphasize this, FIG. 3 illustrates that there are two kinds of records. The first subset of records, collectively referred to as Dataset A, comprises records where the value of every variable is known; such records are referred to as "Complete Data". The second subset of records, R\A, comprises records where the values of some variables are unknown; such records are referred to as "Incomplete Data". Within the Incomplete Data, variables for which values can be observed are referred to as observable variables O, while variables for which values cannot be observed as referred to as incomplete variables I. Thus $X_k(r_j)$ is unknown for each $X_k \in I$ and $r_j \in R\backslash A$. The set of observed data within the Incomplete Data, corresponding to the known values associated with observable variables O, are collectively referred to as Dataset B. The set of unavailable data within the Incomplete Data, corresponding to the unknown values associated with incomplete variables I, are collected referred to as Dataset C. Generally the number of records in Datasets B and C is much larger than the number of records in Dataset A.

Figure 4:
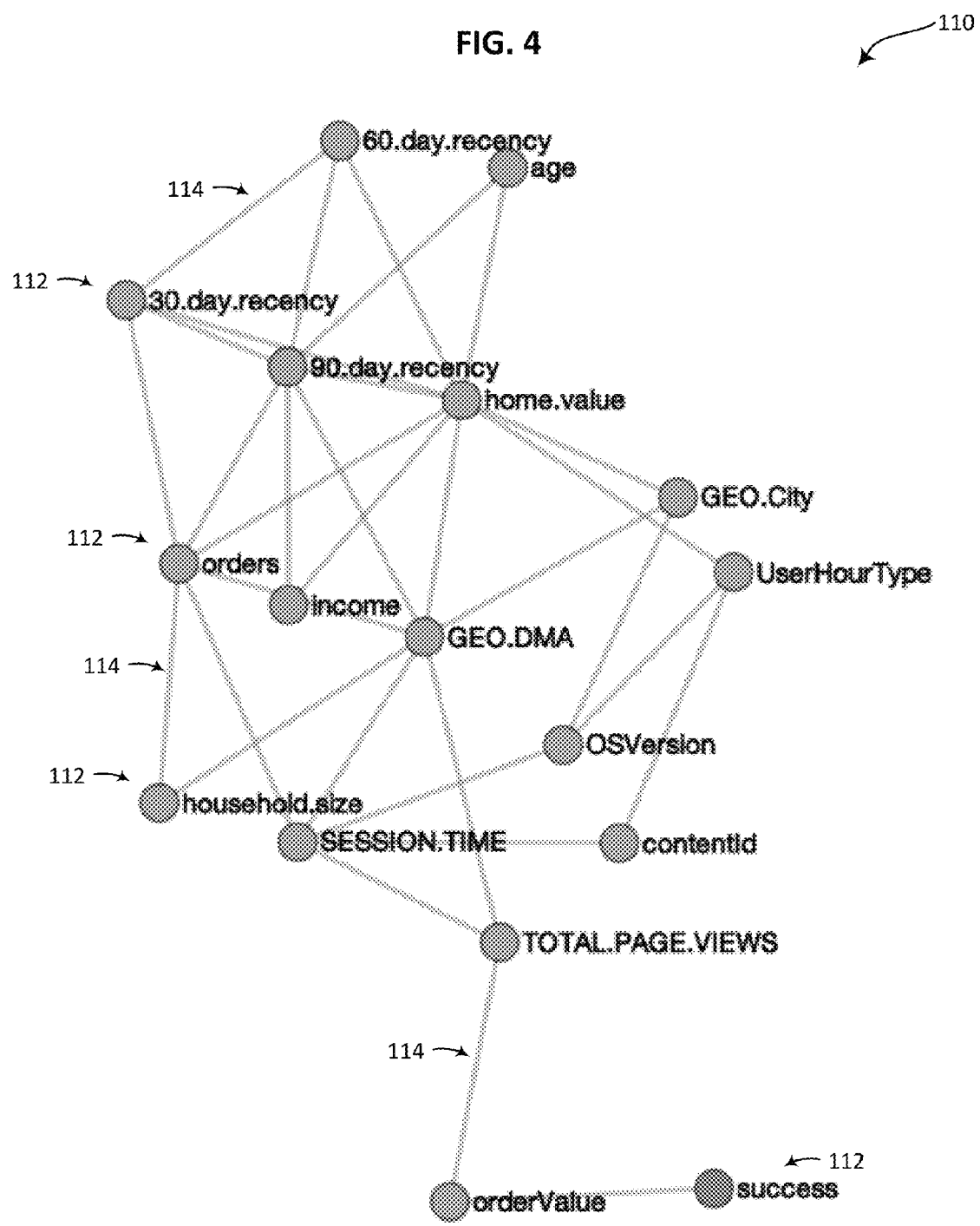
FIG. 4 is a schematic illustration of a belief network that can be used to make predictions with respect to how content consumers will interact with a digital asset in accordance with an embodiment of the present invention.

In certain embodiments user interface module 56 includes a reporting and visualization module 56b which can be used to produce a graphical representation of belief network 100. FIG. 4 is a schematic illustration of a belief network that can be used to make predictions with respect to how content consumers will interact with a digital asset in accordance with an embodiment of the present invention. More specifically, FIG. 4 illustrates an example non-directed acyclic graph 110 that represents a belief network modeling web traffic data. Acyclic graph 110 comprises a plurality of nodes 112, each of which represents a variable modeled by the underlying belief network 100. Example variables illustrated in FIG. 4 include "success" (a true/false indicator based on whether a transaction was consummated or whether some other condition was satisfied), "OSVersion" (indicating the operating system version used by website visitor), and "60.day.recency" (indicating how many times a particular website visitor has visited the website within the last sixty days). Graph 110 also includes a plurality of edges 114 that join highly related variables. In general, a shorter edge (or path of edges) between two variables implies a closer correlation between such variables. In the particular embodiment illustrated in FIG. 4, edges 114 are non-directional because providing a direction to the edges could be interpreted as implying a degree of causation which may be uncertain. In an alternative embodiment edges 114 can be provided with direction, such as through the use of arrows.

For example, referring still to the example graph 110 illustrated in FIG. 4, it can be observed that nodes representing thirty-, sixty-, and ninety-day recency are all closely related to each other, but are all relatively distant from the node representing the success indicator. This suggests that the number of times a website visitor has visited a website is not, by itself, closely correlated to whether that website visitor consummated a transaction. As another example, the success indicator is closely related to the "orderValue" variable since any order value greater than zero necessarily corresponds to consummation of a transaction. Likewise, the success indicator is also closely related to the "TOTAL.PAGE.VIEWS" variable, indicating that the more pages a website visitor views while browsing a website, the more likely that visitor will be to consummate a transaction during such interactions.

Knowledge discovery module 54 can be configured to submit queries to, and extract query results from, belief network 100. For example, in one embodiment knowledge discovery module 54 includes an inference finder 54a which can be configured to evaluate marginal and conditional probability distributions based on belief network 100. Thus in certain embodiments inference finder 54a can be used to generate a marginal probability distribution P("OSVersion") that indicates what type of operating system visitors to a given website are likely to use. In other embodiments inference finder 54a can be used to generate a conditional probability distribution P("OSVersion"|V$_2$="success") that indicates what type of operating system visitors who consummate a transaction using a given website are likely to use. More generally stated, for each variable $V_i \in V$ and each variable-value pair $(V_j, v_j)$, where $V_j \in V$ and $v_j \in \text{Range}(V_j)$, and with $V_i \neq V_j$, inference finder 54a can be configured to determine the probability distributions $P(V_i)$ and $P(V_i|V_j=v_j)$. In other embodiments inference finder 54a can be configured to determine a multivariate conditional probability distribution $P(V_i|V_j=v_j, V_k=v_k, \ldots)$.

Thus inference finder 54a can be configured to evaluate how much knowing the value of a first variable can impact the distribution of the values for a second variable. User interface module 56 may optionally include a query interface 56a which can be used to generate probability distribution queries such as these. In certain embodiments query interface 56a works in conjunction with reporting and visualization module 56b, thereby enabling a user to construct such queries in an intuitive way, such as by clicking on or otherwise selecting nodes 112 appearing in a visual representation of belief network 100, such as illustrated in acyclic graph 110 of FIG. 4. Other query interfaces can be used in other embodiments.

Figure 5:
FIG. 5 is a screenshot of a user interface that can be used to define and display the results of conditional probability distributions in accordance with an embodiment of the present invention.

For example, FIG. 5 is a screenshot of a user interface that can be used to define and display conditional probability distributions in accordance with an embodiment of the present invention. In particular, user interface 200 can be understood as facilitating the definition and display of a generalized conditional probability distribution P(M|C) using inference finder 54a. That is, for the subset of web traffic data A, B ⊂ V, given values b∈Range(B), a conditional probability distribution P(A|B=b) can be evaluated.

User interface 200 includes a listing of variables 210 from which the user may select the target variable 212 (M) for which the probability distribution is sought, as well one or more known variables 214 (C). The listing of variables 210 provides the user with a clear indication of the variables which are modeled by underlying belief network 100, and therefore which are available for analysis. In certain embodiments the values for known variables 214 can be selected using drop-down menu interface elements 220, thereby further providing the user with an indication of the range of values which have been observed for a given variable. As the user builds the target conditional probability distribution using the listing of variables 210 and the drop-down menu interface elements 220, a semantic representation of the query 230 is optionally displayed. Once the target conditional probability distribution is defined and calculated, such distribution can be illustrated, for example, in a graphic display 240. However, it will be appreciated that the calculated distribution can additionally or alternatively be displayed in other ways in other embodiments, such as through the presentation of formatted tabular data. The example user interface illustrated in FIG. 5 shows a graphical distribution of expected incomes of website visitors who are located in New York City ("GEO.City"="New York") and who completed a transaction while browsing a particular website ("success"="TRUE"). That is, graphic display 240 illustrates P(income|"GEO.City"="New York" and "success"="TRUE"). This can provide a website owner with knowledge about the characteristics of the website visitors interacting with a given website.

In addition to the analysis of marginal and conditional probability queries as described herein, knowledge discovery module 54 may also include a large variation finder 54b that is configured to evaluate the extent to which various combinations of variable-value pairs significantly influence the distribution of some other variable. That is, large variation finder 54b can be configured to compute an influence distance $$\mu_j = \max_{v_i \in Range(V_i)} d(P(V_i = v_i), P(V_i = v_i \mid V_j = v_j)), \quad (2)$$

where d(x, y) is understood as a distance between two points that corresponds to a degree of influence. Such a distance can be understood as being represented by the length of a given edge 114 provided in acyclic graph 110 as illustrated in FIG. 4. The maximum value $\mu_j$ represents a measurement of how much knowing that $V_j = v_j$ influences the distribution of the values of $V_i$. This influence of $V_j$ on the distribution of $V_i$ can alternatively be quantified in terms of an influence parameter $$\text{Influence}(V_i, V_j = v_j) = \max_{v_i \in Range(V_i)} \frac{P(V_i = v_i \mid V_j = v_j) - P(V_i = v_i)}{P(V_i = v_i)}. \quad (3)$$

The influence parameter provided by Equation 3 represents the normalized difference between the conditional distribution of $V_i$ given $V_j = v_j$ and the corresponding marginal distribution of $V_i$. In certain embodiments the influence distance $\mu_j$ and/or the influence parameter Influence($V_i$, $V_j = v_j$) can be calculated and ranked for many or all possible tuples $X_i$, $X_j$, $x_j$, where $X_i$, $X_j \in V$ and $x_j \in Range(X_j)$, such that the most relevant probability variants can quickly and easily be identified in response to a user query. Since such calculations may be computationally demanding, in certain embodiments they are optionally performed in advance, thereby enabling knowledge discovery module 54 to respond to user queries faster.

Large variation finder 54b can also be used to identify situations where multiple variables generate an influence only when combined together. That is, for distinct variables $V_i$, $V_j$, $V_k \in V$ and for values $v_j \in Range(V_j)$, $v_k \in Range(V_k)$, large variation finder 54b can be configured to evaluate the difference between the marginal probability distribution $P(V_i)$ and $P(V_i \mid V_j = v_j, V_k = v_k)$. However, to account for the impact of each variable separately, the conditional probability distributions $P(V_i \mid V_j = v_j)$ and $P(V_i \mid V_k = v_k)$ are individually calculated. In particular, if one of the variables ($V_j$, $V_k$) strongly influences V, then the combination of $V_j$ and $V_k$ will have a strong influence on $V_i$ as well, but only because of the influence of the one influential variable. To avoid detection of such a situation, and to identify those situations where multiple variables generate a strong influence as a result of their combination, large variation finder 54b can be configured to compute the influence distance $\mu_j$ as given by Equation 2, as well as the influence distances $$\mu_k = \max_{v_i \in Range(V_i)} d(P(V_i = v_i), P(V_i = v_i \mid V_k = v_k)) \quad (4)$$

and $$\mu_{jk} = \max_{v_i \in Range(V_i)} d(P(V_i = v_i), P(V_i = v_i \mid V_j = v_j, V_k = v_k)). \quad (5)$$

The maximum values for distances $\mu_j$, $\mu_k$ and $\mu_{jk}$ may be reached for different values $v_i$. The maximum value $\mu_k$ represents a measurement of how much knowing that $V_j = v_j$, influences the distribution of the values of $V_k$. Likewise, the maximum value $\mu_{jk}$ represents a measurement of how much knowing both $V_j = v_j$ and $V_k = v_k$ influences the distribution of the values of $V_i$. This combined influence of $V_j$ and $V_k$ on the distribution of $V_i$ can alternatively be quantified in terms of an influence parameter $$\text{Influence}(V_i, V_j = v_j, V_k = v_k) = \quad (6)$$

$$\max_{v_i \in Range(V_i)} \frac{P(V_i = v_i \mid V_j = v_j) - P(V_i = v_i)}{P(V_i = v_i)},$$

which represents the normalized difference between the conditional distribution of $V_i$ given both $V_j = v_j$ and $V_k = v_k$ and the corresponding marginal distribution of $V_i$. It is possible to assign a distance $\sigma_u$ to the tuple $u = (V_i, V_j, v_j, V_k, v_k)$, wherein $$\sigma_u = d(\mu_{jk}, \max(\mu_j, \mu_k)). \quad (7)$$

The distance $\sigma_u$ can be understood as being represented by the length of a given edge 114 provided in acyclic graph 110 as illustrated in FIG. 4. In certain embodiments the influence distances $\mu_j$, $\mu_k$, $\mu_{jk}$ and $\sigma_u$ can be calculated and ranked for many or all possible tuples ($X_i$, $X_j$, $x_j$), such that the most relevant probability variants can be easily identified in response to a user query. Since such calculations may be computationally demanding, in certain embodiments they are optionally performed in advance, thereby enabling knowledge discovery module 54 to respond to user queries faster.

In certain embodiments large variation finder 54b works in conjunction with reporting and visualization module 56b, thereby enabling a user to construct such queries intuitively, such as by clicking on or otherwise selecting nodes 112 appearing in a visual representation of belief network 100, such as illustrated in acyclic graph 110 of FIG. 4. Other query interfaces can be used in other embodiments. For example, in one embodiment where certain of the foregoing influence distances and/or parameters are calculated in advance, clicking on a selected node 112 causes a table to be generated listing variable-value pairs $(V_j, v_j)$ that have the greatest influence on the variable $V_i$ corresponding to selected node 112. For example, FIG. 6 illustrates a table ranking the most influential variable-value pairs $(V_j, v_j)$ on a selected variable $V_i$="success" as determined by a large variation finder in accordance with an embodiment of the present invention. In particular, FIG. 6 illustrates a table 300 that indicates variable-value pairs 310 which have the greatest statistical influence 320 on whether a particular website visitor has a "successful" website browsing outcome ($V_i$="success"=$v_i$="TRUE"), such as may be defined by consummation of a transaction, enrollment in a service, or the like. Influence 320 can be determined, for example, using Equation 3 above. In certain embodiments, table 300 can be obtained by clicking on the "success" node of acyclic graph 110 of FIG. 4, although it will be appreciated that such a table could be generated based on other types of user input in other embodiments.

Referring still to FIG. 6, table 300 includes a variable-value pair 340 corresponding to $V_j$="GEO.City" and $v_j$="New York" having an influence parameter of 36.34%, as provided by Equation 3. This influence parameter represents the normalized difference between (a) the conditional distribution of "success" for website visitors from New York, and (b) the corresponding marginal distribution of such "success". Table 300 also includes variable-value pairs 330 corresponding to variables that indicate substantial website browsing activity, such as more than eight total page views and a session browsing time of greater than 100,000 time units. Such variables are also associated with a large influence parameter that indicates a strong influence on whether a particular website browsing session is likely to ultimately be considered a "success". These examples illustrate how table 300 provides a website owner with an indication of the most influential factors that may influence whether a successful browsing outcome results, thus allowing a wide range of inferences to be drawn therefrom. It will be appreciated that in other embodiments table 300 can be configured to indicate the least influential factors in this regard, as would be indicated by a negative influence parameter. In either case, such knowledge is extracted from belief network 100 by knowledge discovery module 54.

Figure 7:
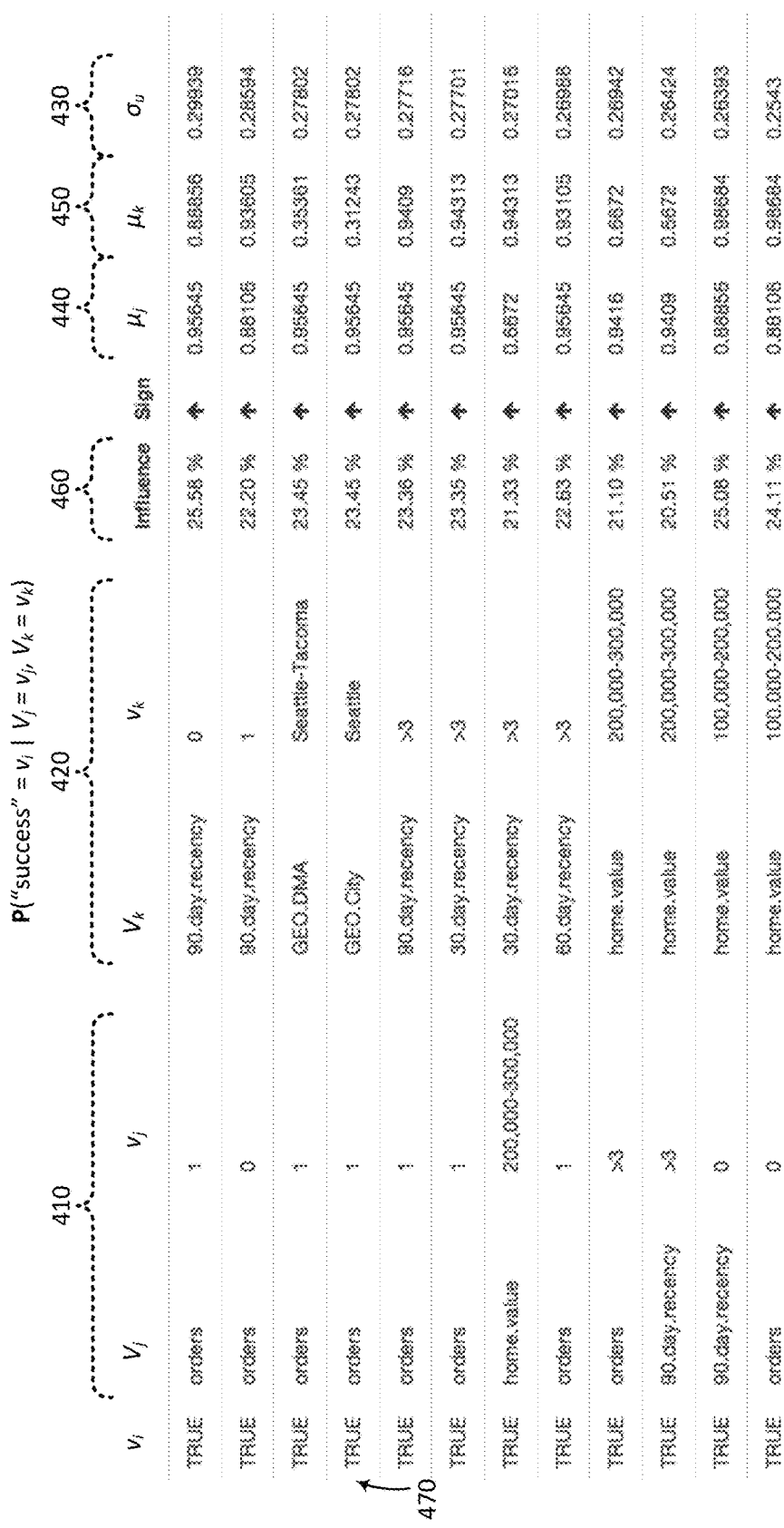
FIG. 7 is a table ranking the combined influence of multiple variable-values pairs $(V_j, v_j)$ and $(V_k, v_k)$ on the distribution of a selected variable $V_i$="success" as determined by a large variation finder in accordance with an embodiment of the present invention.

While FIG. 6 illustrates an example of using large variation finder 54b to find strong single-variable influences, the methods disclosed herein can also be used to find strong multivariate influences as well, such as may occur where multiple variables generate an influence when combined together, but not when considered separately. For example, FIG. 7 illustrates a table ranking the combined influence of multiple variable-values pairs $(V_j, v_j)$ and $(V_k, v_k)$ on the distribution of a selected variable $V_i$="success" as determined by a large variation finder in accordance with an embodiment of the present invention. In particular, FIG. 7 illustrates a table 400 that indicates first variable-value pairs 410 and second variable-value pairs 420 which, when combined, are closely correlated to whether a particular website visitor has a "successful" website browsing outcome ($V_i$="success"=$v_i$="TRUE"). This correlation can be measured by the conceptual distance $\sigma_u$, as given by Equation 7 and as indicated in column 430 of table 400. In particular, as indicated by Equation 7, the conceptual distance $\sigma_u$ represents the difference between the joint influence $\mu_{jk}$ and the maximum of the individual influences, $\mu_j, \mu_k$, as indicated in columns 440, 450, respectively, of table 400. Table 400 may also optionally include an influence parameter 460, as defined by Equation 6. In certain embodiments, table 400 can be obtained by clicking on the "success" node of acyclic graph 110 of FIG. 4, although it will be appreciated that such a table could be generated based on other types of user input in other embodiments.

Referring still to FIG. 7, table 400 includes a variable-value pair 470 corresponding to $V_j$="orders", $v_j$=1, $V_k$="GEO.City", and $v_k$="Seattle" having a conceptual distance $\sigma_u$ of 0.27802 as provided by Equation 7. This conceptual distance represents the extent to which the combination of a website visitor from Seattle having made one previous order increases the likelihood of a successful website browsing outcome as compared to a website visitor having only one of such characteristics. In this example, conceptual distance $\sigma_u$ is relatively high because the conditional probability distribution P(success|"GEO.City"="Seattle") is overall lower than an average probability of success across the entire population of observed web traffic data. But when this location information is combined with the knowledge that the website visitor has previously placed an order, the fact that the website visitor is from Seattle is highly statistically relevant. Thus large variation finder 54b can be used to identify such large variations between a single-variable probability distribution and a corresponding multivariate probability distribution as demonstrated here.

In certain embodiments knowledge discovery module 54 also includes a popular profile finder 54c that is configured to determine the most likely values for a plurality of variables $V_a, V_b, V_c, \ldots$ given values one or more for variables $V_i, V_j, V_k, \ldots$, thereby completing a total assignment of the variables while retaining the given fixed values. The most likely joint values can be determined using a max-product algorithm calculated using on the conditional probability distributions of each unknown variable based on the given values for the fixed variables. This can be particularly useful to website owners who seek to define a "popular profile" of a typical website visitor given one or more fixed variable-value pairs. In general, popular profile finder 54c can be configured to find the N most likely website visitor profiles for one or more given fixed variable-value pairs, N≥1.

Figure 8:
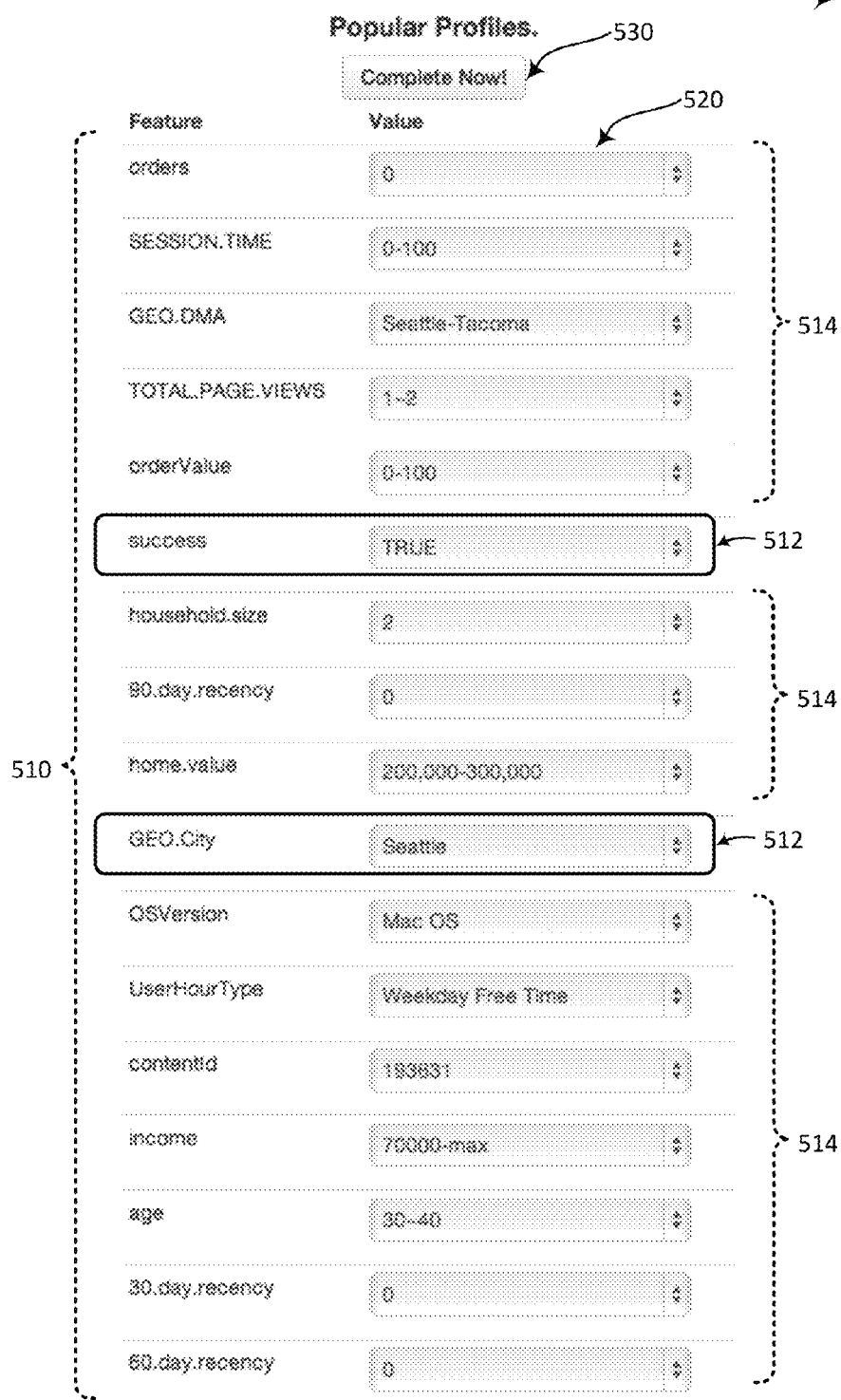
FIG. 8 is a screenshot of a user interface that can be used to fix one or more values for variables $V_i$, $V_j$, $V_k$, ... and display the most likely values for a plurality of variables $V_a$, $V_b$, $V_c$, ..., in accordance with an embodiment of the present invention.

In certain embodiments popular profile finder 54c works in conjunction with query interface 56a, thereby enabling a user to construct such entities intuitively. For example, FIG. 8 is a screenshot of a user interface that can be used to fix one or more values for variables $V_i, V_j, V_k, \ldots$, and display the most likely values for a plurality of variables $V_a, V_b, V_c, \ldots$, in accordance with an embodiment of the present invention. In particular, FIG. 8 illustrates a popular profiles user interface 500 that includes a plurality of variable-value pairs 510. In such embodiments, each variable is associated with a user interface element 520 that allows a value or range of values to be selected. For example, if a website owner wishes to obtain a profile of customers from Seattle who have consummated a purchase, the user interface element associated with the "success" variable can be set to "TRUE" and the user interface element associated with the "GEO.City" variable can be set to "Seattle". Thus variable-value pairs 512 correspond to user-defined fixed pairs 512. The user may then select a user interface element 530 that initiates calculation of a most likely profile associated with such fixed pairs 512. The results may be disclosed using the same user interface, as can be seen in conjunction with calculated variable-value pairs 514. Thus, in this example, the website owner can observe that the typical purchasing customer from Seattle has a relatively high income and is most likely to use the Mac OS operating system. Displaying the results of the calculation using the same user interface as that provided for setting fixed pairs 512 facilitates subsequent calculations based on modified fixed pairs 512. In alternative embodiments additional information can be displayed with the calculated profile, such as a confidence measure and/or a ranking of popular profiles.

In some cases there may be only a limited number of records within the collected web traffic data 38 for which one or more given variable-value pairs $V_j=v_j$, $V_k=v_k$, . . . exist. In this example, where $V_j=v_j$ and/or $V_k=v_k$ strongly affect the marginal distribution of $V_i$, such influence may be the result of random noise in a small sample size, rather than the result of an actual influence. Thus in certain embodiments knowledge discovery module 54 is optionally configured to set a sample size threshold below which large variations are not reported. This advantageously avoids presenting a website owner with evidence of an influential relationship that is, in fact, caused by random noise in a small sample size.

Figure 9A:
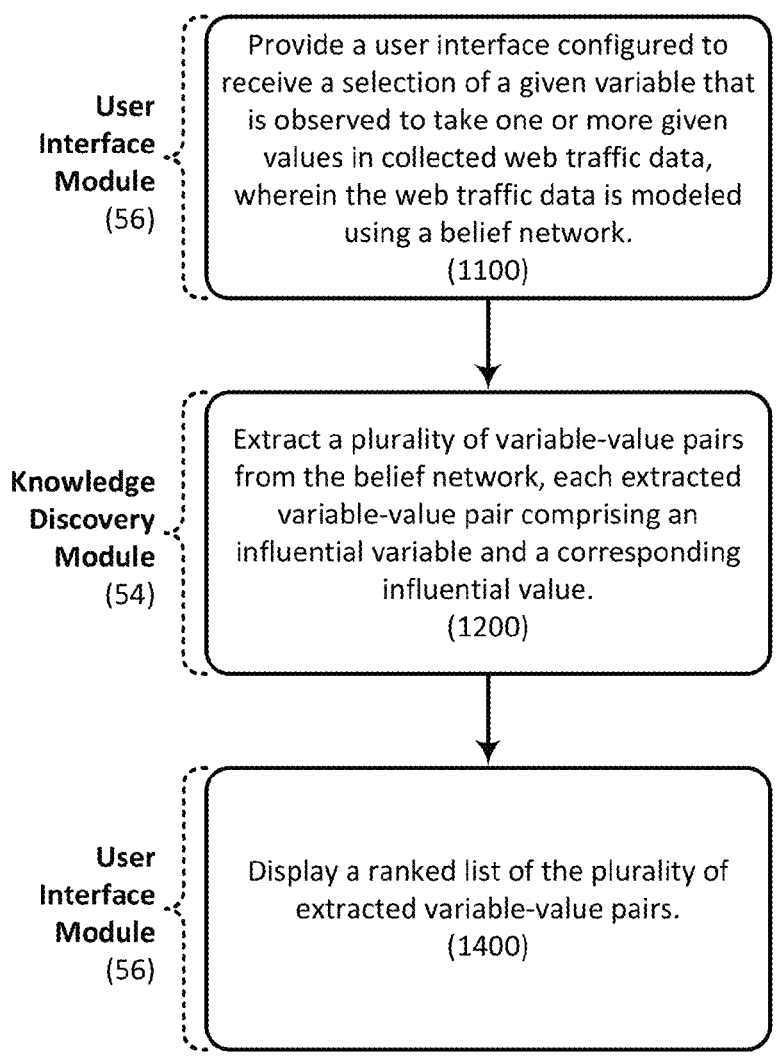
FIG. 9A is a flowchart illustrating a first example technique for evaluating the extent to which various combinations of variable-value pairs significantly influence the distribution of some other variable, in accordance with an embodiment of the present invention.

FIG. 9A is a flowchart illustrating a method 1000 for evaluating the extent to which various combinations of variable-value pairs significantly influence the distribution of some other variable. Method 1000 comprises using user interface module 56 to receive a selection of a given variable that is observed to take one or more given values in collected web traffic data. See reference numeral 1100 in FIG. 9A. The web traffic data is modeled using a belief network. Method 1000 further comprises using knowledge discovery module 54 to extract a plurality of variable-value pairs from the belief network. See reference numeral 1200 in FIG. 9A. Each extracted variable-value pair comprises an influential variable and a corresponding influential value. Method 1000 further comprises using user interface module 56 to display a ranked list of the plurality of extracted variable-value pairs. See reference numeral 1400 in FIG. 9A.

Figure 9B:
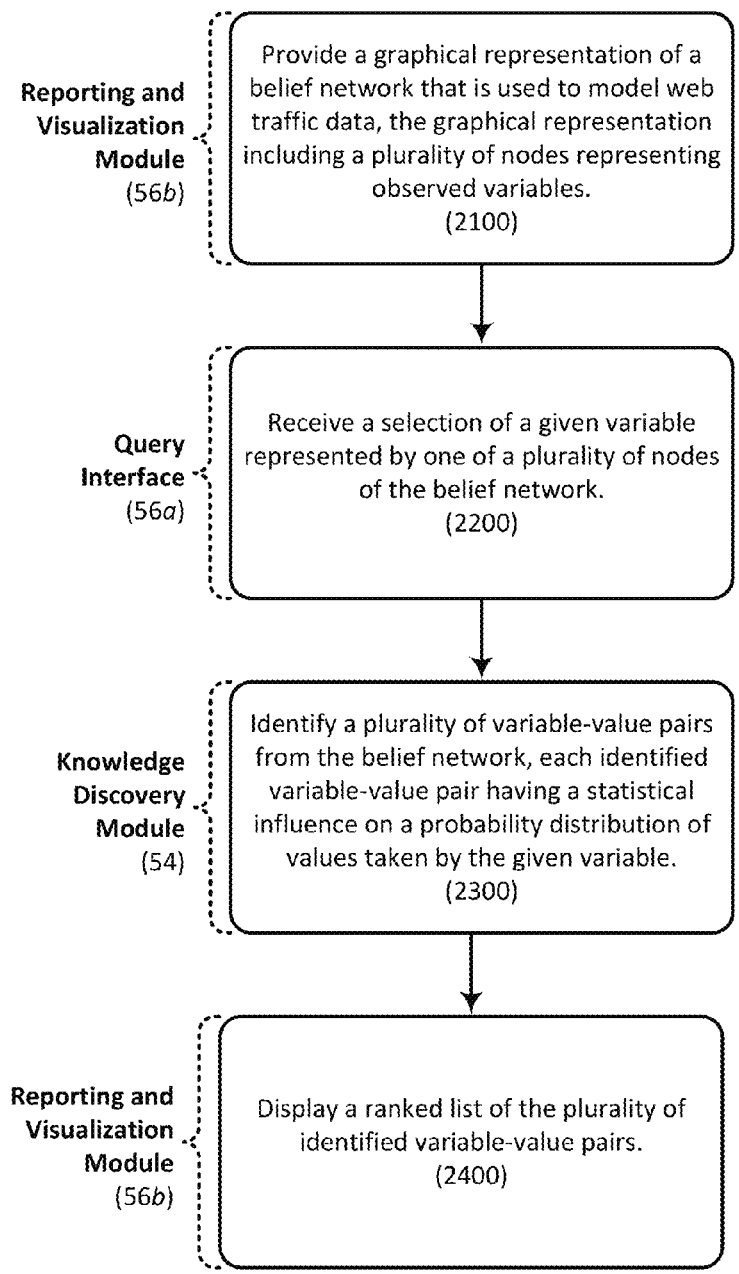
FIG. 9B is a flowchart illustrating a second example technique for evaluating the extent to which various combinations of variable-value pairs significantly influence the distribution of some other variable, in accordance with an embodiment of the present invention.

FIG. 9B is a flowchart illustrating an alternative method 2000 for evaluating the extent to which various combinations of variable-value pairs significantly influence the distribution of some other variable. Method 2000 comprises using reporting a visualization module 56b to provide a graphical representation of a belief network that is used to model web traffic data. See reference numeral 2100. The graphical representation includes a plurality of nodes representing observed variables. Method 2000 further comprises using query interface 56a to receive a selection of a given variable represented by one of a plurality of nodes of the belief network. See reference numeral 2200 in FIG. 9B. Method 2000 further comprises using knowledge discovery module 54 to identify a plurality of variable-value pairs from the belief network. See reference numeral 2300 in FIG. 9B. Each identified variable-value pair has a statistical influence on a probability distribution of values taken by the given variable. Method 2000 further comprises using reporting and visualization module 56b to display a ranked list of the plurality of identified variable-value pairs. See reference numeral 2400 in FIG. 9B.

Figure 9C:
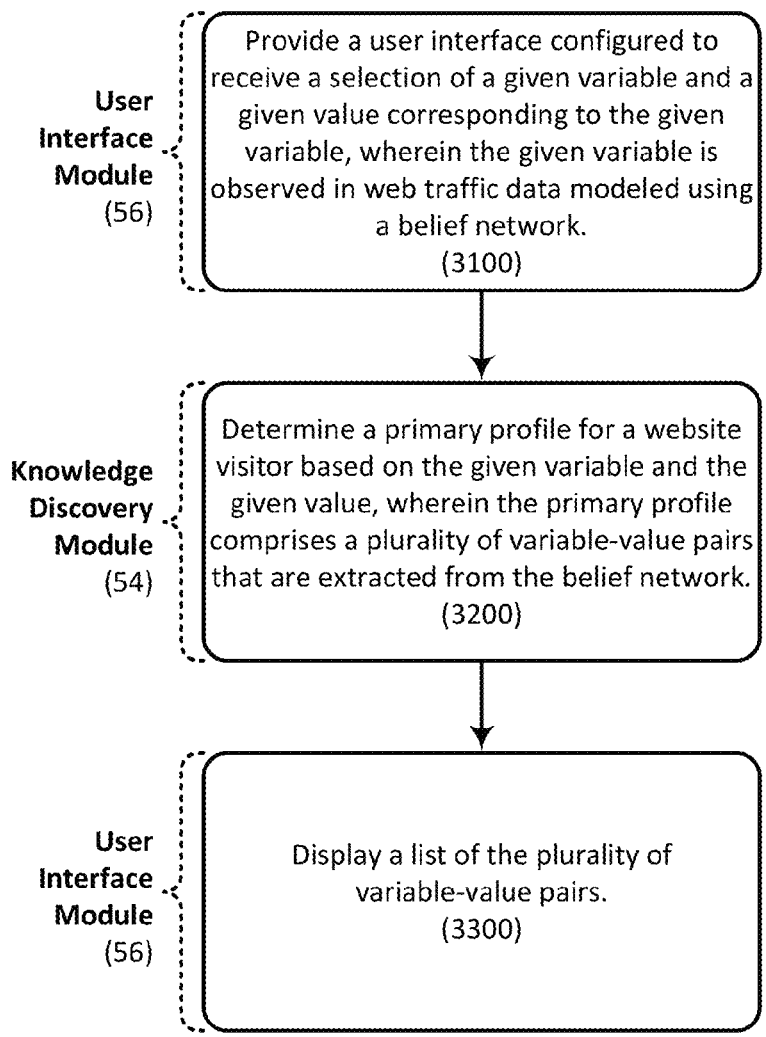
FIG. 9C is a flowchart illustrating an example technique for determining the most likely values for a plurality of variables $V_a$, $V_b$, $V_c$, ... given values one or more for variables $V_i$, $V_j$, $V_k$, ..., in accordance with an embodiment of the present invention.

FIG. 9C is a flowchart illustrating a method 3000 for determining the most likely values for a plurality of variables $V_a$, $V_b$, $V_c$, . . . given values one or more for variables $V_i$, $V_j$, $V_k$, . . . . Method 3000 comprises using user interface module 56 to provide a user interface configured to receive a selection of a given variable and a given value corresponding to the given variable. See reference numeral 3100 in FIG. 9C. The given variable is observed in web traffic data modeled using a belief network. Method 3000 further comprises using knowledge discovery module 54 to determine a primary profile for a website visitor based on the given variable and the given value. See reference numeral 3200 in FIG. 9C. The primary profile comprises a plurality of variable-value pairs that are extracted from the belief network. Method 3000 further comprises using user interface module 56 to display a list of the plurality of variable-value pairs. See reference numeral 3300 in FIG. 9C.

CONCLUSION

Numerous variations and configurations will be apparent in light of this disclosure. For instance, one example embodiment provides a method for deriving information from a belief network that is used to model web traffic data. The method comprises providing a user interface configured to receive a selection of a given variable that is observed to take one or more given values in collected web traffic data. The web traffic data is modeled using a belief network. The method further comprises extracting a plurality of variable-value pairs from the belief network, each extracted variable-value pair comprising an influential variable and a corresponding influential value. Each extracted variable-value pair has a statistical influence on a probability distribution of values taken by the given variable. The method further comprises displaying a ranked list of the plurality of extracted variable-value pairs. The ranked list is ordered based on an influence parameter that quantifies the statistical influence a particular extracted variable-value pair has on the probability distribution of values taken by the given variable. In some cases the influence parameter corresponds to a normalized difference between (a) a conditional distribution of the given variable given the influential variable and the corresponding influential value and (b) a marginal distribution of the given variable. In some cases the influence parameter is determined before the selection of the given variable is received. In some cases the given variable corresponds to a success indicator based on a web browsing outcome and wherein the given value is a true/false flag. In some cases the method further comprises extracting a plurality of secondary variable-value pairs from the belief network, each extracted secondary variable-value pair comprising a secondary influential variable and a corresponding secondary influential value, wherein a combination of a selected extracted variable-value pair and the extracted secondary variable-value pair has a combined statistical influence on the probability distribution that is greater than the statistical influence caused by the selected extracted variable-value pair. In some cases the influence parameter corresponds to a normalized difference between (a) a conditional distribution of the given variable given a plurality of influential variables and a corresponding plurality of influential values and (b) a marginal distribution of the given variable. In some cases the influential value comprises a range of values that, when taken by the influential variable, renders the statistical influence on the probability distribution of values taken by the given variable. In some cases the user interface is further configured to display a graphical representation of the belief network, the graphical representation including a plurality of nodes representing observed variables and a plurality of edges representing a correlation between connected nodes.

Another example embodiment of the present invention provides a system for deriving information from a belief network that is used to model web traffic data. The system comprises a visualization module configured to provide a graphical representation of a belief network that is used to model web traffic data. The graphical representation includes a plurality of nodes representing observed variables and a plurality of edges representing a correlation between connected nodes. The system further comprises a query interface configured to receive a selection of a given variable represented by one of the plurality of nodes. The system further comprises a knowledge discovery module configured to identify a plurality of variable-value pairs from the belief network. Each identified variable-value pair (a) comprises an influential variable and a corresponding influential value, and (b) has a statistical influence on a probability distribution of values taken by the given variable. The visualization module is further configured to display a ranked list of the plurality of identified variable-value pairs. The ranked list is ordered based on an influence parameter that quantifies the statistical influence a particular identified variable-value pair has on the probability distribution of values taken by the given variable. In some cases the system further comprises a visitor analytics engine that is connected to a website server via a network, wherein (a) the visitor analytics engine includes the visualization module, the query interface and the knowledge discovery module; and (b) the web traffic data is generated as a result of website visitor interaction with content served by the website server. In some cases the web traffic data modeled using the belief network comprises (a) a first subset of records having known values for a plurality of variables; and (b) a second subset of records having known values for a first subset of the plurality of variables and unknown values for a second subset of the plurality of variables. In some cases the given variable corresponds to a success indicator based on a web browsing outcome and wherein the given variable takes a value corresponding to a true/false flag. In some cases a selected two of the plurality of variable-value pairs identified by the knowledge discovery module have a combined statistical influence that is greater than the respective statistical influences of the selected two variable-value pairs taken individually. In some cases (a) a selected two of the plurality of variable-value pairs identified by the knowledge discovery module have a combined statistical influences that is greater that the respective statistical influences of the selected two variable-value pairs taken individually; and (b) the ranked list is ordered based on a combined influence parameter that quantifies the combined statistical influence of the selected two of the plurality of variable-value pairs. In some cases the query interface works in conjunction with the visualization module, such that the selection of the given variable can be made by selecting one of the plurality of nodes provided in the graphical representation of the belief network.

Another example embodiment of the present invention provides a non-transient computer readable medium having instructions encoded thereon that, when executed by one or more processors, causes an information derivation process for a belief network to be carried out. The process comprises providing a user interface configured to receive a selection of a given variable and a given value corresponding to the given variable. The given variable is observed in web traffic data modeled using a belief network. The process further comprises determining a primary profile for a website visitor based on the given variable and the given value. The primary profile comprises a plurality of variable-value pairs that are extracted from the belief network based on a correlation to the given variable and the given value. The process further comprises displaying a list of the plurality of variable-value pairs. In some cases the user interface is configured to receive a selection of a plurality of given varies and a corresponding plurality of given values. In some cases the variable-value pairs comprise a variable extracted from the belief network and a range of values corresponding to the extracted variable. In some cases the given variable corresponds to a success indicator based on a web browsing outcome and wherein the given value is a true/false flag. In some cases the process further comprises an alternative profile for the website visitor based on the given variable and the given value, wherein the alternative profile has a reduced probability as compared to the primary profile.

The foregoing description of the embodiments of the invention has been presented for purposes of illustration and description. It is not intended to be exhaustive or to limit the invention to the precise form described. Many modifications and variations are possible in light of this disclosure. It is intended that the scope of the invention be limited not by this detailed description, but rather by the claims appended hereto.

What is claimed is:

1. A method for deriving information from a belief network that is used to model web traffic data, the method comprising:
   receiving, by a web traffic analysis server, web traffic data that is collected by a website administrator, wherein the web traffic data characterizes interactions between a plurality of content consumers and a website that is administered by the website administrator;
   extracting a plurality of variables that are included in the received web traffic data;
   providing a user interface configured to receive a selection of a given variable that is observed to take one or more given values in the received web traffic data;
   modeling a joint probability distribution according to a belief network, wherein the received web traffic data is distributed according to the modeled joint probability distribution;
   extracting a plurality of variable-value pairs from the belief network, each extracted variable-value pair comprising an influential variable and a corresponding influential value;
   determining a statistical influence that each of the extracted variable-value pairs has on a probability distribution of values taken by the given variable, wherein the statistical influence is quantified by an influence parameter associated with each of the extracted variable-value pairs; and
   displaying a ranked list of the plurality of extracted variable-value pairs, the ranked list being ordered based on the influence parameter, wherein the influence parameter is determined before the selection of the given variable is received.

2. The method of claim 1, wherein the influence parameter for a particular influential variable corresponds to a normalized difference between (a) a conditional distribution of the given variable given the particular influential variable and the corresponding influential value and (b) a marginal distribution of the given variable.

3. The method of claim 1, wherein the given variable corresponds to a success indicator based on a web browsing outcome and wherein the given value is a true/false flag.

4. The method of claim 1, further comprising extracting a plurality of secondary variable-value pairs from the belief network, each extracted secondary variable-value pair comprising a secondary influential variable and a corresponding secondary influential value, wherein a combination of a particular extracted variable-value pair and a particular extracted secondary variable-value pair has a combined statistical influence on the probability distribution of values taken by the given variable that is greater than a statistical influence caused by the particular extracted variable-value pair.

5. The method of claim 1, wherein the influence parameter for a particular group of influential variables corresponds to a normalized difference between (a) a conditional distribution of the given variable given the particular group of influential variables and a corresponding group of influential values and (b) a marginal distribution of the given variable.

6. The method of claim 1, wherein a particular influential value comprises a range of values that, when taken by a corresponding particular influential variable, renders the statistical influence on the probability distribution of values taken by the given variable.

7. The method of claim 1, wherein the user interface is further configured to display a graphical representation of the belief network, the graphical representation including a plurality of nodes representing observed variables and a plurality of edges representing a correlation between connected nodes.

8. A system for deriving information from a belief network that is used to model web traffic data, the system comprising:
    a belief network generation module configured to
        receive web traffic data that is collected by a website administrator, wherein the web traffic data characterizes interactions between a plurality of content consumers and a website that is administered by the website administrator,
        extract a plurality of variables that are included in the received web traffic data, and
        model a joint probability distribution according to a belief network, wherein the received web traffic data is distributed according to the modeled joint probability distribution;
    a visualization module configured to provide a graphical representation of the belief network, the graphical representation including a plurality of nodes representing observed variables and a plurality of edges representing a correlation between connected nodes;
    a query interface configured to receive a selection of a given variable represented by one of the plurality of nodes; and
    a knowledge discovery module configured to identify a plurality of variable-value pairs from the belief network, each identified variable-value pair comprising an influential variable and a corresponding influential value, wherein the knowledge discovery module is further configured to determine a statistical influence that each of the identified variable-value pairs has on a probability distribution of values taken by the given variable, wherein the statistical influence is quantified by an influence parameter associated with each of the identified variable-value pairs;
    wherein the visualization module is further configured to display a ranked list of the plurality of identified variable-value pairs, the ranked list being ordered based on the influence parameter, and
    wherein the influence parameter for a particular influential variable corresponds to a normalized difference between (a) a conditional distribution of the given variable given the particular influential variable and the corresponding influential value and (b) a marginal distribution of the given variable.

9. The system of claim 8, further comprising a visitor analytics engine that is connected to a website server via a network, wherein:
    the visitor analytics engine includes the visualization module, the belief network generation module, and the knowledge discovery module.

10. The system of claim 8, wherein the web traffic data modeled using the belief network comprises:
    a first subset of records having known values for the plurality of variables; and
    a second subset of records having known values for a first subset of the plurality of variables and unknown values for a second subset of the plurality of variables.

11. The system of claim 8, wherein the given variable corresponds to a success indicator based on a web browsing outcome and wherein the given variable takes a value corresponding to a true/false flag.

12. The system of claim 8, wherein a particular two of the plurality of variable-value pairs identified by the knowledge discovery module have a combined statistical influence that is greater than the respective statistical influences of the particular two variable-value pairs taken individually.

13. The system of claim 8, wherein:
    a particular two of the plurality of variable-value pairs identified by the knowledge discovery module have a combined statistical influence that is greater that the respective statistical influences of the particular two variable-value pairs taken individually; and
    the ranked list is ordered based on a combined influence parameter that quantifies the combined statistical influence of the particular two of the plurality of variable-value pairs.

14. The system of claim 8, wherein the query interface works in conjunction with the visualization module, such that the selection of the given variable can be made by selecting one of the plurality of nodes provided in the graphical representation of the belief network.

15. A non-transitory computer readable medium having instructions encoded thereon that, when executed by one or more processors, causes an information derivation process for a belief network to be carried out, the process comprising:
    receiving, by a web traffic analysis server, web traffic data that is collected by a website administrator, wherein the web traffic data characterizes interactions between a plurality of content consumers and a website that is administered by the website administrator;
    extracting a plurality of variables that are included in the received web traffic data;
    providing a user interface configured to receive a selection of a given variable that is observed to take one or more given values in the received web traffic data;
    modeling a joint probability distribution according to a belief network, wherein the received web traffic data is distributed according to the modeled joint probability distribution;
    extracting a plurality of variable-value pairs from the belief network, each extracted variable-value pair comprising an influential variable and a corresponding influential value;
    determining a statistical influence that each of the extracted variable-value pairs has on a probability distribution of values taken by the given variable, wherein the statistical influence is quantified by an influence parameter associated with each of the extracted variable-value pairs; and displaying a ranked list of the plurality of extracted variable-value pairs, the ranked list being ordered based on the influence parameter, wherein the influence parameter for a particular influential variable corresponds to a normalized difference between (a) a conditional distribution of the given variable given the particular influential variable and the corresponding influential value and (b) a marginal distribution of the given variable.

16. The non-transitory computer readable medium of claim 15, wherein the given variable corresponds to a success indicator based on a web browsing outcome and wherein the given value is a true/false flag.

17. The non-transitory computer readable medium of claim 15, wherein a particular influential value comprises a range of values that, when taken by a corresponding particular influential variable, renders the statistical influence on the probability distribution of values taken by the given variable.

18. The non-transitory computer readable medium of claim 15, wherein the information derivation process further comprises extracting a plurality of secondary variable-value pairs from the belief network, each extracted secondary variable-value pair comprising a secondary influential variable and a corresponding secondary influential value, wherein a combination of a particular extracted variable-value pair and a particular extracted secondary variable-value pair has a combined statistical influence on the probability distribution of values taken by the given variable that is greater than a statistical influence caused by the particular extracted variable-value pair.

19. The non-transitory computer readable medium of claim 15, wherein the web traffic data modeled using the belief network comprises:

a first subset of records having known values for the plurality of variables; and a second subset of records having known values for a first subset of the plurality of variables and unknown values for a second subset of the plurality of variables.

* * * * *